United States Patent
Pu et al.

(10) Patent No.: US 11,250,546 B2
(45) Date of Patent: Feb. 15, 2022

(54) IMAGE DISTORTION CORRECTION METHOD AND DEVICE AND ELECTRONIC DEVICE

(71) Applicant: Hangzhou Hikvision Digital Technology Co., Ltd., Zhejiang (CN)

(72) Inventors: Shiliang Pu, Zhejiang (CN); Lulu Zhou, Zhejiang (CN); Li Wang, Zhejiang (CN); Xiaoyang Wu, Zhejiang (CN); Di Xie, Zhejiang (CN)

(73) Assignee: Hangzhou Hikvision Digital Technology Co., Ltd., Zhejiang (CN)

( * ) Notice: Subject to any disclaimer, the term of this patent is extended or adjusted under 35 U.S.C. 154(b) by 63 days.

(21) Appl. No.: 16/617,214

(22) PCT Filed: Apr. 16, 2018

(86) PCT No.: PCT/CN2018/083238
§ 371 (c)(1),
(2) Date: Nov. 26, 2019

(87) PCT Pub. No.: WO2018/214671
PCT Pub. Date: Nov. 29, 2018

(65) Prior Publication Data
US 2021/0125310 A1     Apr. 29, 2021

(30) Foreign Application Priority Data

May 26, 2017   (CN) .......................... 201710395423.1

(51) Int. Cl.
*G06T 5/00*     (2006.01)
*G06N 3/04*     (2006.01)
(Continued)

(52) U.S. Cl.
CPC ............... *G06T 5/002* (2013.01); *G06N 3/04* (2013.01); *G06N 3/08* (2013.01); *G06T 5/20* (2013.01);
(Continued)

(58) Field of Classification Search
None
See application file for complete search history.

(56) References Cited

U.S. PATENT DOCUMENTS 10,037,601 B1 *   7/2018  Ben-Ari ............... G06K 9/6226
2006/0139376 A1   6/2006  Le Dinh et al.
(Continued)

FOREIGN PATENT DOCUMENTS

CN     102930518 A     2/2013
CN     103390266 A     11/2013
(Continued)

OTHER PUBLICATIONS

Song, Xibin, Yuchao Dai, and Xueying Qin. "Deep depth super-resolution: Learning depth super-resolution using deep convolutional neural network." Asian conference on computer vision. Springer, Cham, 2016. (Year: 2016).*

(Continued)

*Primary Examiner* — Andrae S Allison
(74) *Attorney, Agent, or Firm* — Bret E. Field; Bozicevic, Field & Francis LLP

(57) ABSTRACT

Embodiments of the present application provide a method, apparatus, and electronic device for eliminating distortion of a distorted image. Side information components of a distorted image are generated. The distorted image is resulted from image processing on an original image. Side information components represent distortion features of the distorted image with respect to original image. Distorted image color components of the distorted image and the side information (Continued)

components are input into a pre-established convolutional neural network model for convolution filtering to obtain distortion-eliminated image color components. The convolutional neural network model is obtained through training based on a preset training set. The training set comprises original sample images, distorted image color components of multiple distorted images corresponding to each of the original sample images, and side information components of each of the distorted images. Thereby, a CNN-based distortion elimination process different from related art is provided.

12 Claims, 7 Drawing Sheets

(51) Int. Cl.
  *G06N 3/08* (2006.01)
  *G06T 5/20* (2006.01)
  *G06T 7/00* (2017.01)

(52) U.S. Cl.
  CPC .. *G06T 7/0002* (2013.01); *G06T 2207/10024* (2013.01); *G06T 2207/20081* (2013.01); *G06T 2207/20084* (2013.01); *G06T 2207/30168* (2013.01)

(56) References Cited

U.S. PATENT DOCUMENTS

| | | |
|---|---|---|
| 2007/0291170 A1 | 12/2007 | Han et al. |
| 2018/0075581 A1* | 3/2018 | Shi ........................ G06N 3/0472 |
| 2018/0173997 A1* | 6/2018 | Shen ....................... G06K 9/628 |
| 2019/0230354 A1* | 7/2019 | Kim ....................... H04N 19/176 |
| 2019/0378242 A1* | 12/2019 | Zhang .................. G06K 9/6201 |
| 2020/0074234 A1* | 3/2020 | Tong .................... G06K 9/6257 |
| 2021/0012487 A1* | 1/2021 | Yu .......................... G16H 15/00 |

FOREIGN PATENT DOCUMENTS

| | | |
|---|---|---|
| CN | 105844640 A | 8/2016 |
| CN | 105976318 A | 9/2016 |
| CN | 106204447 A | 12/2016 |
| CN | 106447609 A | 2/2017 |

OTHER PUBLICATIONS

Svoboda, Pavel, et al. "Compression artifacts removal using convolutional neural networks." arXiv preprint arXiv: 1605.00366 (2016). (Year: 2016).*
J. Kim, J. K. Lee, and K. M. Lee. Accurate image super-resolution using very deep convolutional networks. CoRR, abs/1511.04587, 2015. (Year: 2015).*
Li et al., Convolutional Neural Network-Based Block Up-sampling for Intra Frame Coding, IEEE Transactions on Circuits and Systems for Video Technology, ARXIV.org, Feb. 22, 2017, p. 1-13.
Dong et al., Image Super-Resolution Using Deep Convolutional Networks, ARXIV.org, Jan. 1, 2015, p. 1-14.

* cited by examiner generating side information components of a distorted image — 51 inputting distorted image color components of the distorted image and the generated side information components into a pre-established CNN model for convolution filtering to obtain color components of a distortion-eliminated image — 52

IMAGE DISTORTION CORRECTION METHOD AND DEVICE AND ELECTRONIC DEVICE

The present application claims the priority to Chinese patent application No. 201710395423.1 filed with the China National Intellectual Property Administration on May 26, 2017 and entitled "Image Distortion Correction Method and Device and Electronic Device", which is incorporated herein by reference in its entirety.

TECHNICAL FIELD

The present application relates to the field of image processing technologies, and in particular, to a method for eliminating distortion in a distorted image, a CNN model training method, and apparatus and electronic device thereof.

BACKGROUND

During the processing in a digital image system, filtering, data rounding, quantization, or other processing may cause pixel values to shift in intensity. Visual impairments or artifacts may result from this. In order to avoid or alleviate the above potential problems, image distortion elimination filter can be designed to post-process an image to offset shift in pixel intensity and reduce visual loss.

In conventional image distortion elimination filtering (e.g., de-blocking filters (DF) used in image/video coding standards), features of a distorted image are manually analyzed, filter structure is artificially designed, and filter coefficients are configured based on experiments and experience. Some image distortion elimination filtering can adaptively configure filter structures and filter coefficients based on statistical information of local image regions, such as Sample Adaptive Offset (SAO) in H.265 standard, and Adaptive Loop Filter (ALF) used in video encoding and decoding. These adaptive filters have high complexity and require, when used in the field of encoding and decoding, writing of filter-related parameters that depend on local statistical information into bitstream to ensure consistency between the encoding side and decoding side. This inevitably increases the number of encoded bits.

In recent years, deep learning theory has developed rapidly. Unlike conventional feature extraction algorithms that rely on prior knowledge, deep neural networks can adaptively construct feature descriptions driven by training data, and has higher flexibility and universality.

Deep learning has been very successful in many high-level computer vision problems, such as image classification, target detection, and target segmentation. For example, in 2015, a Super Resolution Convolutional Neural Network (SRCNN)-based end-to-end image super-resolution reconstruction algorithm was proposed in the industry. This network shows advantages over the most leading technology in the field of super-resolution reconstruction at that time. Deep learning also begins to show great potential on low-level computer vision problems. For another example, in light of the application of Convolutional Neural Network (CNN) in super-resolution reconstruction, industry has proposed using multi-layer Artifact Reduction Convolutional Neural Network (ARCNN) obtained by training to perform post-processing filtering on a JPEG-encoded image to eliminate image distortion. This obtains obvious subjective and objective quality improvement over conventional filtering approaches.

At present, the industry also proposes using multi-layer Variable-filter-size Residue-learning Convolutional Neural Network (VRCNN) obtained by training instead of the conventional de-blocking filtering and adaptive sample offset technologies to perform post-processing filtering on an intra-encoded image. Experimental results show that CNN makes great improvement in the subjective and objective quality of a reconstructed image, in comparison with the above-mentioned conventional in-loop filtering approaches.

A CNN-based end-to-end image distortion elimination algorithm contains no image pre-processing and artificial design of filter coefficient, and is capable of a data-driven automatic learning of distortion features and compensation. This algorithm allows easy use, better generalization, and significantly enhanced performance. The algorithm is especially suitable for compression of image/video that has a mixture of various distortions.

SUMMARY OF THE INVENTION

Embodiments of the present application provide a method for eliminating distortion of a distorted image, so as to provide a CNN-based distortion elimination method different from related art.

An embodiment of the present application provides a method for eliminating distortion of a distorted image, including:

generating side information components of a distorted image, wherein, the distorted image is resulted from image processing on an original image, and the side information components represent distortion features of the distorted image with respect to the original image; and inputting distorted image color components of the distorted image and the side information components into a pre-established convolutional neural network model for convolution filtering so as to obtain distortion-eliminated image color components;

wherein, the convolutional neural network model is obtained through training based on a preset training set, and the training set includes original sample images, distorted image color components of multiple distorted images corresponding to each of the original sample images, and side information components of each of the distorted images.

In an embodiment of the present application, the side information components represent at least one of the following distortion features:

a degree of the distortion of the distorted image with respect to the original image;

a position of the distortion of the distorted image with respect to the original image; and a type of the distortion of the distorted image with respect to the original image.

In an embodiment of the present application, generating side information components of a distorted image includes:

determining a distortion degree value of each pixel point in the distorted image; and generating, based on positions of pixel points in the distorted image, side information components of the distorted image by using obtained distortion degree values of pixel points, wherein, the value of each of the side information components corresponds to a pixel point at the same position in the distorted image.

In an embodiment of the present application, determining a distortion degree value of each pixel point in the distorted image includes:

for a distorted image resulted from encoding and decoding, obtaining quantization parameters of each of encoded regions, and determining the distortion degree value of each pixel point in the distorted image as the quantization parameter of an encoded region in which the pixel point is located; or for a distorted image resulted from super-resolution processing, determining the up-sampling multiple in the super-resolution processing as the distortion degree value of each pixel point in the distorted image; or evaluating the distorted image through a non-reference image quality evaluation method to obtain the distortion degree value of each pixel point in the distorted image.

In an embodiment of the present application, generating, based on positions of pixel points in the distorted image, side information components of the distorted image by using obtained distortion degree values of pixel points includes:

determining, according to positions of pixel points in the distorted image, the obtained distortion degree value of each pixel point as the value of a side information component of the distorted image at the same position with the pixel point; or performing normalization on the obtained distortion degree values of pixel points based on the range of the pixel values of the distorted image to obtain normalized distortion degree values, the range of which is the same with the range of the pixel values; determining, according to positions of pixel points in the distorted image, the normalized distortion degree value of each pixel point as the value of a side information component of the distorted image at the same position with the pixel point.

An embodiment of the present application further provides an apparatus for eliminating distortion of a distorted image, including:

a generating module, configured for generating side information components of a distorted image, wherein, the distorted image is resulted from image processing on an original image, and the side information components represent distortion features of the distorted image with respect to the original image; and a filtering module, configured for inputting distorted image color components of the distorted image and the side information components into a pre-established convolutional neural network model for convolution filtering so as to obtain distortion-eliminated image color components;

wherein, the convolutional neural network model is obtained through training based on a preset training set, and the training set includes original sample images, distorted image color components of multiple distorted images corresponding to each of the original sample images, and side information components of each of the distorted images.

In an embodiment of the present application, the side information components represent at least one of the following distortion features:

a degree of the distortion of the distorted image with respect to the original image;

a position of the distortion of the distorted image with respect to the original image; and a type of the distortion of the distorted image with respect to the original image.

In an embodiment of the present application, the generating module is configured for determining a distortion degree value of each pixel point in the distorted image; and generating, based on positions of pixel points in the distorted image, side information components of the distorted image by using obtained distortion degree values of pixel points, wherein, the value of each of the side information components corresponds to a pixel point at the same position in the distorted image.

In an embodiment of the present application, the generating module is configured for:

for a distorted image resulted from encoding and decoding, obtaining quantization parameters of each of encoded regions, and determining the distortion degree value of each pixel point in the distorted image as the quantization parameter of an encoded region in which the pixel point is located; or for a distorted image resulted from super-resolution processing, determining the up-sampling multiple in the super-resolution processing as the distortion degree value of each pixel point in the distorted image; or evaluating the distorted image through a non-reference image quality evaluation method to obtain the distortion degree value of each pixel point in the distorted image.

In an embodiment of the present application, the generating module is configured for:

determining, according to positions of pixel points in the distorted image, the obtained distortion degree value of each pixel point as the value of a side information component of the distorted image at the same position with the pixel point; or performing normalization on the obtained distortion degree values of pixel points based on the range of the pixel values of the distorted image to obtain normalized distortion degree values, the range of which is the same with the range of the pixel values; determining, according to positions of pixel points in the distorted image, the normalized distortion degree value of each pixel point as the value of a side information component of the distorted image at the same position with the pixel point.

An embodiment of the present application further provides an electronic device, including a processor, a communication interface, a memory, and a communication bus, wherein the processor, the communication interface, and the memory are communicatively connected with each other via the communication bus.

The memory is configured to store a computer program;

The processor is configured to execute the computer program so as to perform the method for distortion elimination described in above embodiments.

An embodiment of the present application further provides a computer-readable storage medium having a computer program stored thereon which, when executed by a processor, causes the processor to perform the method for distortion elimination described in above embodiments.

An embodiment of the present application further provides a computer program which, when executed by a processor, causes the processor to perform the method for distortion elimination described in above embodiments.

In the method for eliminating distortion of a distorted image provided by the embodiments of the present application, the CNN model as used is obtained by training based on a preset training set, wherein the preset training set includes original sample images, distorted image color components of multiple distorted images corresponding to each of the original sample images, and side information components of each of the distorted images. The side information components can represent distortion features of a distorted image with respect to an original sample image. In the process of distortion elimination filtering, for a distorted image, side information components of distorted image are first generated, and then distorted image color components and side information components of the distorted image are input into a pre-established CNN model for convolution filtering to obtain distortion eliminated image color components. Thereby, the distortion elimination processing is performed on the distorted image using a CNN model.

An embodiment of the present application further provides method for training a CNN model, including:

obtaining a preset training set; wherein the preset training set includes original sample images, distorted image color components of multiple distorted images corresponding to each of the original sample images, and side information components of each distorted image that represent distortion features of the distorted image with respect to the original sample image;

inputting distorted image color components and side information components of each distorted image in the preset training set into a convolutional neural network of a preset structure for convolution filtering, so as to obtain color components of a distortion-eliminated image corresponding to the distorted image;

determining a loss value of the distortion-eliminated image based on original image color components of the original sample image and obtained color components of the distortion-eliminated image; and completing the training when convergence of the convolutional neural network of preset structure is determined based on the loss value, and thereby obtaining a CNN model.

In an embodiment of the present application, the side information components represent at least one of the following distortion features:

a degree of the distortion of the distorted image with respect to the original image;

a position of the distortion of the distorted image with respect to the original image; and a type of the distortion of the distorted image with respect to the original image.

In an embodiment of the present application, the side information components of a distorted image are generated through the following steps:

determining a distortion degree value of each pixel point in the distorted image; and generating, based on positions of pixel points in the distorted image, side information components of the distorted image by using obtained distortion degree values of pixel points, wherein, the value of each of the side information components corresponds to a pixel point at the same position in the distorted image.

In an embodiment of the present application, determining a distortion degree value of each pixel point in the distorted image includes:

for a distorted image resulted from encoding and decoding, obtaining quantization parameters of each of encoded regions, and determining the distortion degree value of each pixel point in the distorted image as the quantization parameter of an encoded region in which the pixel point is located; or for a distorted image resulted from super-resolution processing, determining the up-sampling multiple in the super-resolution processing as the distortion degree value of each pixel point in the distorted image; or evaluating the distorted image through a non-reference image quality evaluation method to obtain the distortion degree value of each pixel point in the distorted image.

In an embodiment of the present application, generating, based on positions of pixel points in the distorted image, side information components of the distorted image by using obtained distortion degree values of pixel points includes:

determining, according to positions of pixel points in the distorted image, the obtained distortion degree value of each pixel point as the value of a side information component of the distorted image at the same position with the pixel point; or performing normalization on the obtained distortion degree values of pixel points based on the range of the pixel values of the distorted image to obtain normalized distortion degree values, the range of which is the same with the range of the pixel values; determining, according to positions of pixel points in the distorted image, the normalized distortion degree value of each pixel point as the value of a side information component of the distorted image at the same position with the pixel point.

An embodiment of the present application further provides an apparatus for training a convolutional neural network model, including:

an obtaining module, configured for obtaining a preset training set; wherein the preset training set includes original sample images, distorted image color components of multiple distorted images corresponding to each of the original sample images, and side information components of each distorted image that represent distortion features of the distorted image with respect to the original sample image;

a calculating module, configured for inputting distorted image color components and side information components of each distorted image in the preset training set into a convolutional neural network of a preset structure for convolution filtering, so as to obtain color components of a distortion-eliminated image corresponding to the distorted image;

a loss value determining module, configured for determining a loss value of the distortion-eliminated image based on original image color components of the original sample image and obtained color components of the distortion-eliminated image; and a model determining module, configured for completing the training when convergence of the convolutional neural network of preset structure is determined based on the loss value, and thereby obtaining a CNN model.

In an embodiment of the present application, the side information components represent at least one of the following distortion features:

a degree of the distortion of the distorted image with respect to the original image;

a position of the distortion of the distorted image with respect to the original image; and a type of the distortion of the distorted image with respect to the original image.

In an embodiment of the present application, the apparatus further includes:

a generating module, configured for generating side information components of a distorted image, and further configured for:

determining a distortion degree value of each pixel point in the distorted image; and generating, based on positions of pixel points in the distorted image, side information components of the distorted image by using obtained distortion degree values of pixel points, wherein, the value of each of the side information components corresponds to a pixel point at the same position in the distorted image.

In an embodiment of the present application, the generating module is configured for:

for a distorted image resulted from encoding and decoding, obtaining quantization parameters of each of encoded regions, and determining the distortion degree value of each pixel point in the distorted image as the quantization parameter of an encoded region in which the pixel point is located; or for a distorted image resulted from super-resolution processing, determining the up-sampling multiple in the super-resolution processing as the distortion degree value of each pixel point in the distorted image; or evaluating the distorted image through a non-reference image quality evaluation method to obtain the distortion degree value of each pixel point in the distorted image.

In an embodiment of the present application, the generating module is configured for:

determining, according to positions of pixel points in the distorted image, the obtained distortion degree value of each pixel point as the value of a side information component of the distorted image at the same position with the pixel point; or performing normalization on the obtained distortion degree values of pixel points based on the range of the pixel values of the distorted image to obtain normalized distortion degree values, the range of which is the same with the range of the pixel values; determining, according to positions of pixel points in the distorted image, the normalized distortion degree value of each pixel point as the value of a side information component of the distorted image at the same position with the pixel point.

An embodiment of the present application further provides an electronic device, including a processor, a communication interface, a memory, and a communication bus, wherein the processor, the communication interface, and the memory are communicatively connected with each other via the communication bus.

The memory is configured to store a computer program;

The processor is configured to execute the computer program so as to perform the training method steps described in above embodiments.

An embodiment of the present application further provides a computer-readable storage medium having a computer program stored thereon which, when executed by a processor, causes the processor to perform the training method steps described in above embodiments.

An embodiment of the present application further provides a computer program which, when executed by a processor, causes the processor to perform the training method steps described in above embodiments.

In the CNN model training method provided by the embodiments of the present application, the preset training set used for training includes an original sample image, distorted image color components of multiple distorted images corresponding to the original sample image, and side information components of each distorted image. The side information components can represent distortion features of the distorted image with respect to the original sample image. Thereby, a CNN model for performing distortion elimination processing on a distorted image is provided.

Of course, any of the products or methods of the present application does not necessarily achieve all the advantages described above.

BRIEF DESCRIPTION OF THE DRAWINGS

In order to more clearly describe the technical solutions, the embodiments of the present application and the prior art, accompanying drawings that need to be used in embodiments and the prior art will be briefly described below. Obviously, accompanying drawings described below are for only some of embodiments of the present application; those skilled in the art may also obtain other accompanying drawings based on these accompanying drawings without any creative efforts.

DETAILED DESCRIPTION OF THE INVENTION

Figure 1:
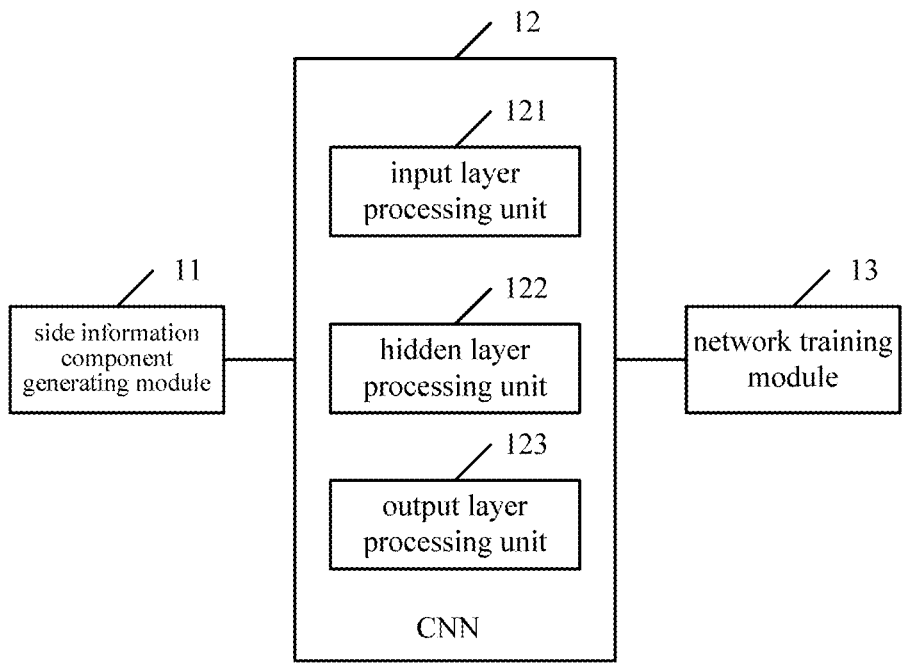
FIG. 1 is a system architecture diagram of a technical solution provided by an embodiment of the present application.

The present application is described in more detail below with reference to the drawings and embodiments. Obviously, the described embodiments are only some of, but not all the embodiments of the present application. All other embodiments obtained based on the embodiments of the present application by those skilled in the art without any creative efforts fall into the scope the present application.

Embodiment of the present application provides a solution to the problem of how use CNN to eliminate distortion of an image. In the solution, for a distorted image resulted from image processing on an original image, side information components that represent distortion features of the distorted image from the original image are generated. The generated side information components, together with color components of the distorted image, are used as input of a pre-established CNN model for convolution filtering. After the convolution filtering, color components of a distortion-eliminated image are obtained and used to generate a distortion-eliminated image.

Further, in the solution, the CNN model is obtained through training with a preset training set. The preset training set includes original sample images, color components of distorted images corresponding to each of the original sample images, and side information components corresponding to each distorted image. The CNN model is obtained from iterative training with a preset network structure and initialized network parameters.

The training set may include an original sample image. The original sample image may be subject to the above image processing. As such, a plurality of distorted images with respective distortion features may be resulted. Color components and side information components of each distorted image can be obtained.

The training set may also include a plurality of original sample images. Each sample image is subject to the above image processing so that a plurality of distorted images with respective distortion features are resulted. Color components and side information components of each distorted image are thus obtained.

During the training of the CNN model and the distortion elimination filtering of a distorted image with the CNN model, side information components representing distortion features of the distorted image from the original image serve as input of the model. In other words, information capable of representing distortion features of a distorted image is introduced. From model trainings on various side information components and practical applications thereof, it is determined that a CNN model having enhanced generalization ability (i.e., generally enhanced ability in distortion elimination of a large number of distorted images with different distortion disagrees) can be obtained through training with certain side information components. Therefore, distorted images can have their distortion properly eliminated. As such, color components of a distortion-eliminated image as obtained are more similar to color components of the original image.

There are many CNN model-based approaches for eliminating image distortion at present. However, in case where a single pre-trained network is used for post-processing filtering of images with different distortion degrees (e.g., images encoded with different quantization parameters in the field of codec, super-resolution images with different up-sampling multiples), most of these CNN based distortion elimination approaches provide barely increased or even reduced qualities for images with certain distortion degrees. This indicates that there are still problems to be solved in regards of a network's generalization capability.

Among existing solutions for the problem, a proposal is that, a set of network parameters are trained for each image with a specific distortion degree, and is loaded accordingly in practice in case of the corresponding distortion degree. However, this requires a large amount of parameters that would consume storage space and computing resources, especially when the parameters are frequently loaded in practice.

Therefore, for the processing of a specific digital image system, a single CNN applicable to post-processing filtering of images having different distortion degrees is of great merit.

With a single set of network parameters, CNN in prior art is not able to cope with the distortion elimination filtering of distorted images with different degrees of distortion. Embodiments of the present application propose solution to this problem. Side information components representing the degree of distortion of the distorted image from the original image can be generated. A preset training set may include distorted images with different degrees of distortion. When the training of the CNN model is performed and the trained CNN model is used to perform distortion elimination processing on an distorted image, information that can accurately represent the degrees of distortion of the distorted images is introduced. In this way, a CNN model applicable to various distorted images with different degrees of distortion can be obtained by training. As such, a better distortion elimination effect can be obtained by using only one set of network parameters for the distorted images with different degrees of distortion.

FIG. 1 illustrates the architecture of a system for implementation of the solution. The system includes a side information component generating module 11, a CNN 12, and a network training module 13.

The CNN 12 may have a three-layered structure, including an input layer processing unit 121, a hidden layer processing unit 122 and an output layer processing unit 123.

The input layer processing unit 121 is configured to receive an input of the CNN and perform a first layer convolution filtering on the input data. The input may include, in the present example, color components and side information components of the distorted image.

The hidden layer processing unit 122 is configured for performing at least one layer of convolution filtering on the output data of the input layer processing unit 121.

The output layer processing unit 123 is configured for performing a last layer of convolution filtering on the output data of the hidden layer processing unit 122. The output is used as color components of a distortion-eliminated image so as to generate a distortion-eliminated image.

Figure 2:
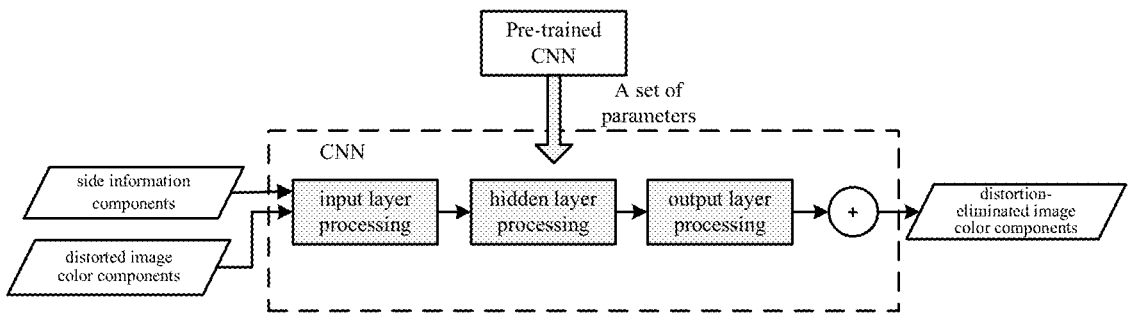
FIG. 2 is a schematic diagram of data flow of a technical solution provided by an embodiment of the present application.

FIG. 2 is a diagram of a data flow for implementation of the solution. Distorted color components and side information components of a distorted image are input, as input data, into a pre-trained CNN model. The CNN model can be configured with a preset structure and a set of network parameters. The input data is subjected to convolution filtering by the input layer, the hidden layer, and the output layer. Data of a distortion-eliminated image is obtained.

In the above solution provided by the embodiment of the present application, the input data of the CNN model may include one or more types of side information components and one or more types of distorted image color components as required in practice. For example, the input data may include at least one of R color components, G color components, and B color components. Accordingly, a distortion-eliminated image also includes one or more types of color components.

For example, in image processing, distortion may only occur to one type of color components. As such, the input data for distortion elimination contains only this type of color component. It may also occur that two types of color components are subject to distortion and are both taken as input data. Accordingly, the corresponding distortion removed image color components are output.

Each pixel point of an image stores values for all types of color components. In the embodiment of the present application, the values for one or more types of color components can be extracted from the stored data of each pixel point as required. Therefore, distorted image color component(s) of the distorted image are obtained.

Figures 3, 4A:
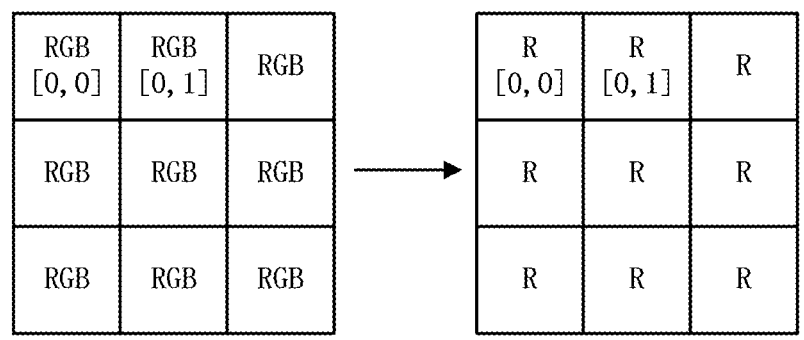
FIG. 3 is a schematic diagram of obtaining a distorted image color component of a distorted image in an embodiment of the present application.
FIG. 4A is a first schematic diagram of side information components in an embodiment of the present application.

As shown in FIG. 3, an example of RGB space is shown. The value of the R color component of each pixel point is extracted therefrom. In this way, R color components of the distorted image are obtained.

The side information components, which represent distortion features of the distorted image with respect to the original image, characterize the distortions that occurs during the image processing.

In practical applications, the above distortion features may include at least one of the following distortion features: distortion degree, distortion position, and distortion types:

First, side information components can represent the degree of distortion of the distorted image with respect to the original image.

Secondly, side information components can also represent the position of distortion of the distorted image with respect to the original image. For example, in typical video codec applications, an image is usually divided into a plurality of non-overlapping encoded units with various sizes. The encoded units are individually subject to predictive encoding and quantization processing of different accuracies. Therefore, distortions of encoded units are typically different. Pixel mutations may occur at boundaries of encoded units. Therefore, boundary coordinates of an encoded unit can be used as a priori side information that represents position of distortion.

Further, side information components can also represent types of distortions of the distorted image with respect to the original image. For example, in a video codec application, different encoded units in the image may be subject to different prediction modes. This may affect the distribution of residual data. Features of the distorted image are thus affected. Therefore, prediction mode of an encoded unit can be used as side information that characterizes the type of distortion.

In the embodiment, side information components may be from one or more of the types as listed above, or solely from one type. For example, after image processing, the distortion degree of the distorted image may be represented by parameters of the same physical meanings, or represented by parameters of different physical meanings. Accordingly, if required in practice, one or more types of distortion degree-representing side information components may be used as input data.

As shown in FIG. 4A, a matrix structure of side information components is the same as a matrix structure of distorted image color components, wherein the coordinates [0,0] and [0,1] represent distortion positions, and the element value 1 of the matrix represents distortion degree, that is, side information components can indicate both distortions degrees and positions.

Figures 4B, 5:
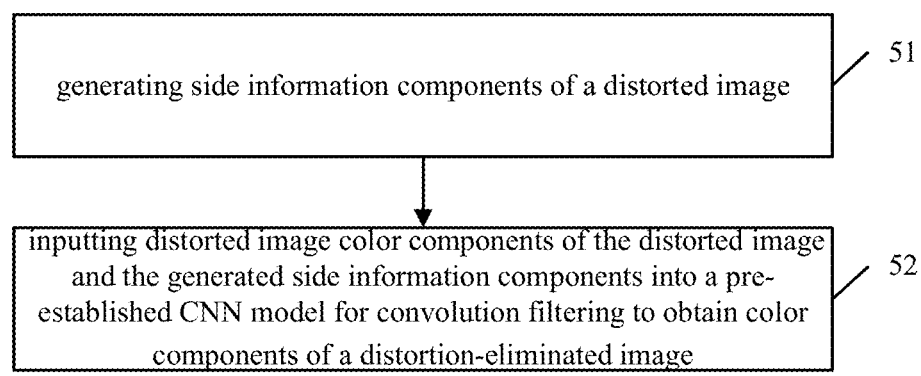
FIG. 4B is a second schematic diagram of side information components in an embodiment of the present application.
FIG. 5 is a flowchart of a method for eliminating distortion of a distorted image provided by an embodiment of the present application.

As also shown in FIG. 4B, coordinates [0,0], [0,1], [2,0] and [2,4] represent positions of distortions, and the element values 1 and 2 of the matrix represent types of distortions. Therefore, side information components can indicate both degrees and positions of distortions.

Moreover, in the above solution provided by the embodiment of the present application, two types of side information components as illustrated in FIG. 4A and FIG. 4B may be both utilized.

Depending on requirements in practice, in case there are multiple types of distorted image color components, side information components may include side information components corresponding to each of the distorted image color components respectively.

The foregoing solution provided by the embodiment of the present application can be applied to various practical application scenarios, for example, a scenario in which an image is subject to super-resolution processing. Embodiments are not limited in this aspect.

In the foregoing solution provided by the embodiment of the present application, a method for eliminating distortions in a distorted image is provided. As shown in FIG. 5, the method specifically includes the following processing steps:

Step 51: generating side information components of a distorted image.

The distorted image is the result of image processing on an original image. Side information components represent distortion features of the distorted image with respect to the original image, and thus can characterize distortions that occur during image processing.

Step 52: inputting distorted image color components of the distorted image and the generated side information components into a pre-established CNN model for convolution filtering to obtain color components of a distortion-eliminated image.

The CNN model can be obtained by training with a preset training set, and the preset training set includes original sample images, distorted image color components of multiple distorted images corresponding to each of the original sample images, and side information components of each distorted images.

The above-described method for eliminating distortion of a distorted image will be described in detail below by taking the side information component representing the degree of distortion of the distorted image with respect to the original image as the example.

Figure 6:
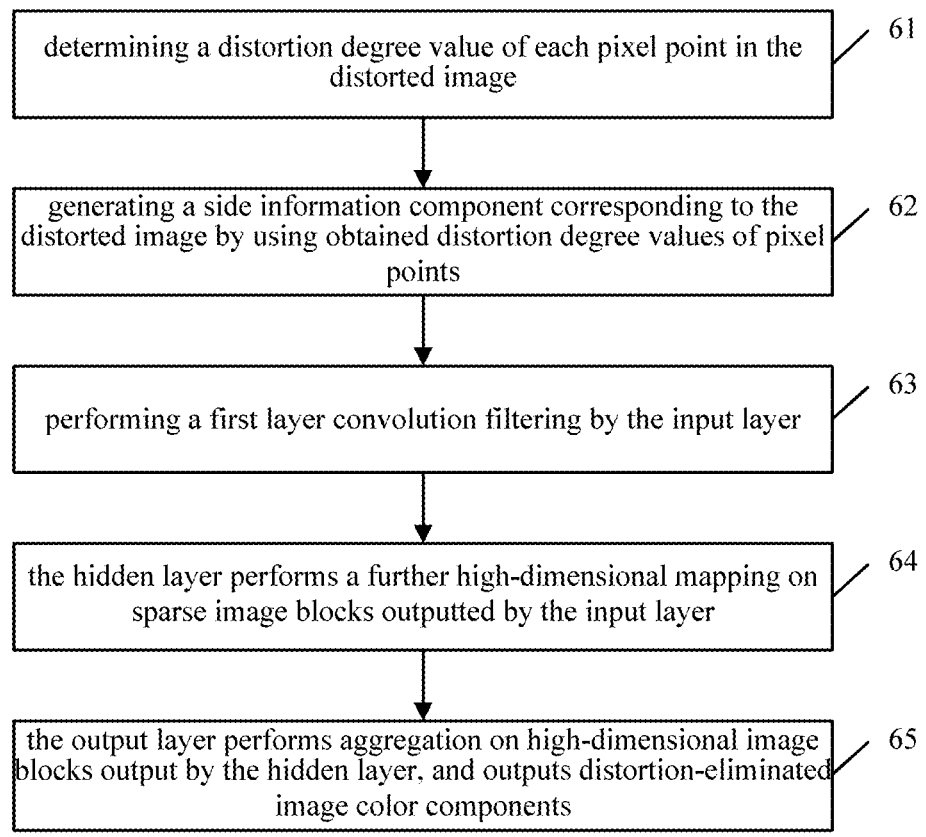
FIG. 6 is a flowchart of a method for eliminating distortion of a distorted image provided by an embodiment of the present application.

FIG. 6 is a flowchart of a method for eliminating distortions in a distorted image provided by an embodiment of the present application, which specifically includes the following processing steps:

Step 61: determining, for a distorted image to be processed, a distortion degree of each pixel point in the distorted image.

In practical applications, after the image processing of the original image in different manners, the physical parameters representing the degree of distortion may also be different. Therefore, in this step, a distortion degree value that can accurately represent the degree of distortion of a pixel point can be determined in the following manners.

The first manner is for a distorted image resulted from encoding and decoding. In this case, a quantization parameter of each encoded region is known, that is, the quantization parameter of each encoded region can be obtained. A distortion degree of each pixel point in the distorted image is determined as the quantization parameter of an encoded region in which the pixel point is located.

The second method is for a distorted image resulted from super-resolution processing. In this case, an image has a known up-sampling multiple. A distortion degree of each pixel point in the distorted image can be determined as the up-sampling multiple in super-resolution processing. For example, in super-resolution processing of an image, an image with a resolution of 100×100 needs to be processed into an image with a resolution of 200×200, then the up-sampling multiple is 2.

The two manners above are used in the case where an image has a known distortion degree. For a distorted image resulted from other image processing methods, as long as distortion degree is known, distortion degree value indicating the distortion degree of each pixel can be similarly determined as a parameter capable of representing distortion degrees used when performing image processing.

For a distorted image with an unknown degree of distortion, a third manner as described below, can be used.

In this manner, a distorted image is evaluated through a non-reference image quality evaluation method to obtain a distortion degree of each pixel point in the distorted image.

For example, the non-reference image quality evaluation method may be a subjective image quality evaluation method. A subject scores the quality of a distorted image according to his subjective viewing experience. The score can be determined as the distortion degree of each pixel point of the distorted image.

Step 62: generating, based on positions of pixel points in the distorted image, side information components of the distorted image by using obtained distortion degrees of pixel points.

Each component value included in the side information components corresponds to a pixel point at the same position in the distorted image.

Since each component value included in the side information component corresponds to a pixel point of the same position in the distorted image, the side information component has the same structure as the distorted image color component of the distorted image. That is, the matrix representing side information components and the matrix representing distorted image color components are of the same type.

In this step, the obtained distortion degree value of each pixel point may be determined, according to positions of pixel points in the distorted image, to be the value of a side information component of the distorted image at the same position with the pixel point. That is, distortion degree value of each pixel point is directly determined as the component value of the pixel point.

When the range of pixel values of the distorted image is different from the range of the distortion degree values of pixel points, the obtained distortion degree values of pixel points may be normalized based on the range of the pixel values of the distorted image to obtain normalized distortion degree values. The range of normalized distortion degree values is the same as the range of pixel values.

Then, determining, according to positions of pixel points in the distorted image, the normalized distortion degree value of each pixel point to be the value of a side information component of the distorted image at the same position with the pixel point.

In this step, the distortion degree values of the pixel points can be normalized by the following formula:

$$norm(x) = \frac{(x - QP_{MIN}) \cdot (PIXEL_{MAX} - PIXEL_{MIN})}{(QP_{MAX} - QP_{MIN})} + PIXEL_{MIN};$$

wherein, norm(x) is normalized distortion degree value, x is distortion degree value of to pixel point, and the range of the pixel values of the distorted image is [$PIXEL_{MIN}$, $PIXEL_{MAX}$], and the range of the distortion degree values of pixel points is [$QP_{MIN}$, $QP_{MAX}$].

Through the above Step 61 and Step 62, side information components of the distorted image are generated. The process of generating the side information components can also be understood as generating a side information guide map for the distorted image, which represents distortion degree of the distorted image with the side information component thereof. The side information guide map and the distorted image are of equal width and height.

In the embodiment of the present application, the solution is described by taking the structure of the CNN model including an input layer, a hidden layer, and an output layer as an example.

Step 63: using the distorted image color components of the distorted image and the generated side information components as input data of the pre-established CNN model, and performing a first layer convolution filtering by the input layer, which may be specifically as follows.

In CNN model, input data can be input to the network through respective channels. In this step, the distorted image color component Y of the $c_y$ channel and the side information component M of the $c_m$ channel can be combined in the channel dimension, to compose the input data I of the $c_y+c_m$ channels, and performing multidimensional convolution filtering and nonlinear mapping on the input data I by using the following formula to generate $n_1$ image blocks represented in a sparse form:

$$F_1(I) = g(W_1 * I + B_1);$$

Wherein, $F_1$(I) is output of the input layer, I is input of the convolutional layer in the input layer, * represents convolution operation, $W_1$ is weight coefficient of a convolution layer filter bank of the input layer, and $B_1$ is offset coefficient of the convolution layer filter bank of the input layer, g( ) is a nonlinear mapping function.

Wherein, $W_1$ corresponds to $n_1$ convolution filters, that is, $n_1$ convolution filters are used for the input of the convolution layer of the input layer; $n_1$ image blocks are output; the size of the convolution kernel of each convolution filter is $c_1 \times f_1 \times f_1$, $c_1$ is the number of input channels, and $f_1$ is the spatial size of each convolution kernel.

In a specific embodiment, the parameters of the input layer may be: $c_1=2$, $f_1=5$, $n_1=64$, a rectified linear unit (ReLU) function is used as g( ), its function expression is:

$$g(x) = \max(0, x);$$

then the convolution processing of the input layer in this embodiment is expressed as:

$$F_1(I) = \max(0, W_1 * I + B_1).$$

Step 64: the hidden layer performs a further high-dimensional mapping on the sparse image block $F_1$(I) outputted by the input layer.

In the embodiment of the present application, the number of convolution layers included in the hidden layer, the connection modes of the convolution layers, and the properties of the convolution layers are not limited in embodiments. Various structures known at present may be adopted, but the hidden layer includes at least 1 convolution layer.

For example, a hidden layer contains N−1 (N≥2) convolutional layer(s), and then the hidden layer processing is expressed as:

$$F_i(I) = g(W_i * F_{i-1}(I) + B_i), i \in \{2, 3, \ldots, N\};$$

Wherein, $F_i$(I) represents the output of the i-th convolutional layer in the CNN, * represents a convolution operation, $W_i$ is weight coefficient of the i-th convolutional layer filter bank, and $B_i$ is offset coefficient of the convolution layer filter bank, and g( ) is a nonlinear mapping function.

Wherein, $W_i$ corresponds to $n_i$ convolution filters, that is, $n_i$ convolution filters are applied used for the input of the i-th convolution layer, and $n_i$ image blocks are output; the size of the convolution kernel of each convolution filter is $c_i \times f_i \times f_i$, $c_i$ is the number of input channels, and $f_i$ is spatial size of each convolution kernel.

In a specific embodiment, the hidden layer may include one convolution layer, and the convolution filter parameters of the convolution layer are: $c_2=64$, $f_2=1$, $n_2=32$. The ReLU function is used as g( ), then the convolution processing of the hidden layer in this embodiment is expressed as:

$$F_2(I) = \max(0, W_2 * F_1(I) + B_2).$$

Step 65: the output layer performs aggregation on the high-dimensional image block $F_N$(I) output by the hidden layer, and outputs the distortion-eliminated image color component for generating the distortion eliminated image.

The structure of the output layer is not limited in the embodiment of the present application. It may be a Residual Learning structure, a Direct Learning structure, or other structures.

The processing with Residual Learning structure is as follows.

Convolution operation is performed on output of the hidden layer to obtain compensation residual, which is then added to the input distorted image color components to obtain distortion-eliminated image color components, i.e., to obtain the distortion-eliminated image. The output layer processing can be expressed by the following formula:

$$F(I)=W_{N+1}*F_N(I)+B_{N+1}+Y;$$

wherein F (I) is output of the output layer, $F_N$ (I) is output of the hidden layer, * represents the convolution operation, and $W_{N+1}$ i weight coefficient of the convolution layer filter bank of the output layer, $B_{N+1}$ is offset coefficient of the convolution layer filter bank of the output layer, and Y represents distorted image color components that are not subjected to convolution filtering and will be subjected to distortion elimination processing.

Wherein, $W_{N+1}$ corresponds to $n_{N+1}$ convolution filters, that is, $n_{N+1}$ convolution filters are applied to the input of the (N+1)th convolution layer. $n_{N+1}$ image blocks are outputted. $n_{N+1}$ is the number of output distortion-eliminated image color components, and is generally equal to the number of input distorted image color components. If only one distortion-eliminated image color component is output, then $n_{N+1}$ generally takes a value of 1. The size of the convolution kernel of each convolution filter is $c_{N+1} \times f_{N+1} \times f_{N+1}$, $c_{N+1}$ is the number of input channels, and $f_{N+1}$ is the spatial size of each convolution kernel.

The processing with a Direct Learning structure is as follows.

After convolution operation on the output of the hidden layer, distortion-eliminated image color components are directly obtained so as to obtain a distortion eliminated image. The output layer processing can be expressed by the following formula:

$$F(I)=W_{N+1}*F_N(I)+B_{N+1};$$

wherein F (I) is output of the output layer, $F_N$ (I) is output of the hidden layer, * represents convolution operation, $W_{N+1}$ is weight coefficient of the convolution layer filter bank of the output layer, and $B_{N+1}$ is offset coefficient of the convolution layer filter bank of the output layer.

Wherein $W_{N+1}$ corresponds to $n_{N+1}$ convolution filters, that is, $n_{N+1}$ convolution filters are applied to the input of the (N+1)th convolution layer, and $n_{N+1}$ image blocks are output. $n_{N+1}$ is the number of output distortion-eliminated image color components, and is generally equal to the number of input distorted image color components. If only one distortion-eliminated image color component is output, then $n_{N+1}$ generally takes a value of 1. The size of the convolution kernel of each convolution filter is $c_{N+1} \times f_{N+1} \times f_{N+1}$, wherein $c_{N+1}$ is the number of input channels, and $f_{N+1}$ is spatial size of each convolution kernel.

In a specific embodiment, the output layer adopts a Residual Learning structure, and the output layer includes one convolution layer. The convolution filter parameters of the output layer are: $c_3=32$, $f_3=3$, $n_3=1$, then in the embodiment, the convolution processing of the output layer can be expressed by the following formula:

$$F(I)=W_3*F_3(I)+B_3+Y.$$

Figure 7:
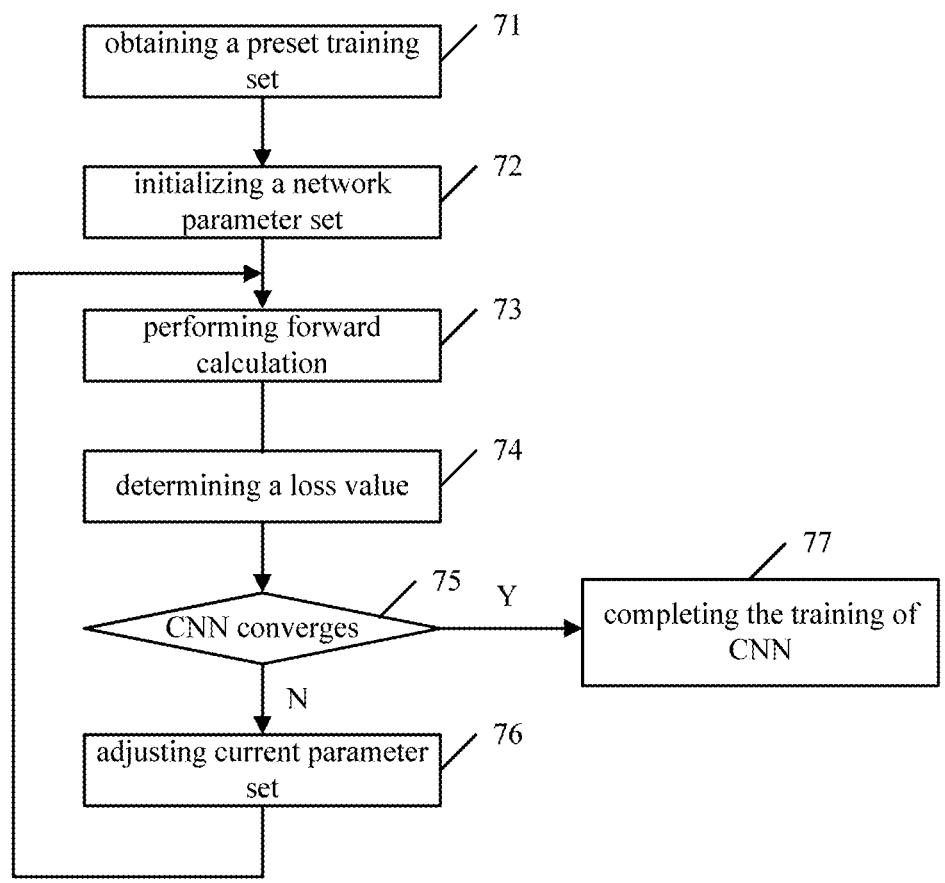
FIG. 7 is a flowchart of a CNN model training method provided by an embodiment of the present application.

In correspondence with the above solution provided by the embodiment of the present application, a CNN model training method is also proposed. As shown in FIG. 7, the method specifically includes the following processing steps.

Step 71: obtaining a preset training set; wherein the preset training set includes original sample images, distorted image color components of multiple distorted images corresponding to each of the original sample images, and side information components of each distorted image that represent distortion features of the distorted image with respect to the original sample image. The distortion features of the multiple distorted images are different.

In this step, the original sample image (i.e., the undistorted natural image) may be subjected to image processing with different degrees of distortion. Corresponding distorted images are thus resulted. According to the steps in the above-described distortion elimination method, side information components are generated for each distorted image, so that each original sample image, corresponding distorted images, and corresponding side information components form an image pair, and the image pairs constitute a preset training set $\Omega$.

The training set may include an original sample image. The original sample images may be subject to the above image processing. As such, a plurality of distorted images with respective distortion features may be resulted. Color components and side information components of each distorted image can be obtained.

The training set may also include a plurality of original sample images. Each sample image is subject to the above image processing so that a plurality of distorted images with respective distortion features are resulted. Color components and side information components of each distorted image are thus obtained.

Step 72: for a CNN of a preset structure, initializing parameters in the CNN network parameter set and the initialized parameter set may be represented by $\Theta_1$, and the initialized parameters may be set according to actual needs and experience.

In this step, high-level parameters related to the training, such as learning rate and gradient descent algorithm, may be set appropriately in various manners known in the art, detailed description of which is not provided herein.

Step 73: performing forward calculation, specifically, including:

inputting distorted image color components and side information components of each distorted image in the preset training set into a CNN of a preset structure for convolution filtering, so as to obtain color components of a distortion-eliminated image corresponding to the distorted image.

In this step, specifically, a forward calculation of the CNN is performed on the preset training set $\Omega$ with a parameter set of $\Theta_i$, and the output F(Y) of the CNN is obtained. In other words, the distortion-eliminated image color components of each distorted image is obtained.

When the step is performed for the first time, the current parameter set is $\Theta_1$. When the step is performed again, the current parameter set $\Theta_i$ is obtained by adjusting the last used parameter set $\Theta_{i-1}$. The detailed description of this will be provided hereafter.

Step 74: determining a loss value of the distortion-eliminated image based on original image color components of the original sample image and obtained color components of the distortion-eliminated image.

Specifically, Mean Squared Error (MSE) formula can be used as the loss function to obtain the loss value $L(\Theta_i)$, as shown in the following formula:

$$L(\Theta_i) = \frac{1}{H}\sum_{h=1}^{H} \|F(I_h | \Theta_i) - X_h\|^2;$$

wherein H is the number of image pairs selected from the preset training set in a single training, and $I_h$ is input data of the combined side information component and the distorted image color component corresponding to the h-th distorted image, $F(I_h|\Theta_i)$ represents the distortion eliminated image color component calculated by the CNN forward calculation in the parameter set $\Theta_i$ for the h-th distorted image, $X_h$ represents the original image color component corresponding to the h-th distorted image, and i is the count number of times that the current forward calculation has been performed.

Step 75: determining, according to the loss value, whether the CNN of the preset structure and parameter set converges; if not, the method proceeds to step 76; if it converges, the method proceeds to step 77.

For example, when loss value is less than a preset loss value threshold, convergence can be determined; or when the difference between the loss value and a previous calculated loss value is less than a preset change threshold, convergence is determined. This is not limited.

Step 76, adjusting the parameters in the current parameter set to obtain an adjusted parameter set, and then proceeds to step 73 for the next forward calculation.

Specifically, back propagation algorithm can be used to adjust the parameters in the current parameter set.

Step 77: using the current parameter set as output final parameter set of $\Theta_{final}$, and using the CNN with the preset structure and the final parameter set $\Theta_{final}$ as the trained CNN model.

Figure 8:
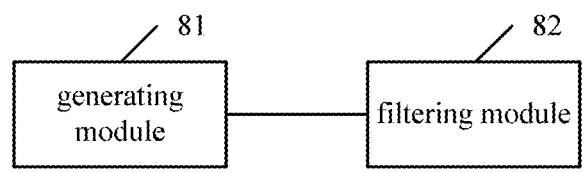
FIG. 8 is a schematic structural diagram of an apparatus for eliminating distortion of a distorted image provided by an embodiment of the present disclosure.

According to the same inventive concept, according to the method for eliminating distortion of a distorted image provided by the above embodiment of the present application, another embodiment of the present application further provides an apparatus for eliminating distortion of a distorted image, a schematic structural diagram thereof is shown in FIG. 8, which specifically includes:

a generating module 81, configured for generating side information components of a distorted image, wherein, the distorted image is resulted from image processing on an original image, and the side information components represent distortion features of the distorted image with respect to the original image; and a filtering module 82, configured for inputting distorted image color components of the distorted image and the side information components into a pre-established convolutional neural network model for convolution filtering so as to obtain distortion-eliminated image color components.

The CNN model is obtained through training based on a preset training set, and the training set includes original sample images, distorted image color components of multiple distorted images corresponding to each of the original sample images, and side information components of each of the distorted images.

In an embodiment of the present application, the side information components may represent at least one of the following distortion features:

a degree of the distortion of the distorted image with respect to the original image;

a position of the distortion of the distorted image with respect to the original image; and a type of the distortion of the distorted image with respect to the original image.

In an embodiment of the present application, the generating module 81 may be specifically configured for determining a distortion degree value of each pixel point in the distorted image; and generating, based on positions of pixel points in the distorted image, side information components of the distorted image by using obtained distortion degree values of pixel points, wherein, the value of each of the side information components corresponds to a pixel point at the same position in the distorted image.

In an embodiment of the present application, the generating module 81 is specifically configured for:

for a distorted image resulted from encoding and decoding, obtaining quantization parameters of each of encoded regions, and determining the distortion degree value of each pixel point in the distorted image as the quantization parameter of an encoded region in which the pixel point is located; or for a distorted image resulted from super-resolution processing, determining the up-sampling multiple in the super-resolution processing as the distortion degree value of each pixel point in the distorted image; or evaluating the distorted image through a non-reference image quality evaluation method to obtain the distortion degree value of each pixel point in the distorted image.

In an embodiment of the present application, the generating module 81 is specifically configured for:

determining, according to positions of pixel points in the distorted image, the obtained distortion degree value of each pixel point as the value of a side information component of the distorted image at the same position with the pixel point; or performing normalization on the obtained distortion degree values of pixel points based on the range of the pixel values of the distorted image to obtain normalized distortion degree values, the range of which is the same with the range of the pixel values; determining, according to positions of pixel points in the distorted image, the normalized distortion degree value of each pixel point as the value of a side information component of the distorted image at the same position with the pixel point.

In the embodiment shown in FIG. 8, the CNN model used is obtained by training based on a preset training set. The preset training set includes original sample images, distorted image color components of multiple distorted images corresponding to each of the original sample images, and side information components of each distorted image. The side information components can represent distortion features of the distorted image with respect to the original sample image. In the process of distortion elimination filtering, for the distorted image, side information components of the distorted image is first generated, and then distorted image color components and the side information components of the distorted image are input into a pre-established CNN model for convolution filtering to obtain a distortion-eliminated image color component. Thereby, the distortion elimination processing is performed on the distorted image using the CNN model.

Figure 9:
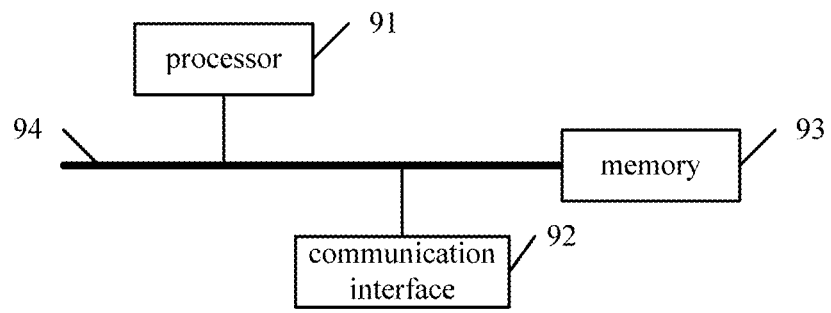
FIG. 9 is a schematic structural diagram of an electronic device provided by an embodiment of the present disclosure.

Based on the same inventive concept as the method for eliminating distortion of a distorted image provided by the above-mentioned embodiments of the present application, another embodiment of the present application further provides an electronic device, and a schematic structural diagram thereof is shown in FIG. 9. The electronic device specifically include:

a processor 91, a communication interface 92, a memory 93, and a communication bus 94, wherein the processor 91, the communication interface 92, and the memory 93 complete communication with each other through the communication bus 94.

The memory 93 is configured to store a computer program.

The processor 91 is configured to execute the computer program so as to perform the method steps for eliminating distortion of a distorted image. The method for eliminating distortion of a distorted image includes:

generating side information components of a distorted image, wherein, the distorted image is resulted from image processing on an original image, and the side information components represent distortion features of the distorted image with respect to the original image; and inputting distorted image color components of the distorted image and the side information components into a pre-established convolutional neural network model for convolution filtering so as to obtain distortion-eliminated image color components;

wherein, the convolutional neural network model is obtained through training based on a preset training set, and the training set includes original sample image, distorted image color components of multiple distorted images corresponding to each of the original sample images, and side information components of each of the distorted images.

In the embodiment shown in FIG. 9, the CNN model used is obtained by training based on a preset training set. The preset training set includes an original sample image, distorted image color components of multiple distorted images corresponding to the original sample image, and side information components of each distorted image. The side information components can represent distortion features of the distorted image with respect to the original sample image. In the process of distortion elimination filtering, for the distorted image, side information components of the distorted image is first generated, and then distorted image color components and the side information components of the distorted image are input into a pre-established CNN model for convolution filtering to obtain a distortion-eliminated image color component. Thereby, the distortion elimination processing is performed on the distorted image using the CNN model.

Based on the same inventive concept as the method for eliminating distortion of a distorted image provided by the above-mentioned embodiments of the present application, an embodiment of the present application further provides a computer-readable storage medium. The storage medium has a computer program stored thereon which, when executed by a processor, causes the processor to perform the method for eliminating distortion of a distorted image. The method for eliminating distortion of a distorted image includes:

generating side information components of a distorted image, wherein, the distorted image is resulted from image processing on an original image, and the side information components represent distortion features of the distorted image with respect to the original image; and inputting distorted image color components of the distorted image and the side information components into a pre-established convolutional neural network model for convolution filtering so as to obtain distortion-eliminated image color components;

wherein, the convolutional neural network model is obtained through training based on a preset training set, and the training set includes original sample images, distorted image color components of multiple distorted images corresponding to each of the original sample images, and side information components of each of the distorted images.

In the above-mention embodiment, the CNN model used is obtained by training based on a preset training set, wherein the preset training set includes original sample images, distorted image color components of multiple distorted images corresponding to each of the original sample images, and a side information component corresponding to each distorted image, the side information component can represent the distortion feature of the distorted image relative to the original sample image; in the process of performing distortion elimination filtering, for the distorted image, the side information component corresponding to the distorted image is first generated, and then distorted image color component and the side information component of the distorted image are input into a pre-established CNN model for convolution filtering to obtain a distortion eliminated image color component. Thereby, the distortion elimination processing is performed on the distorted image using the CNN model.

Based on the same inventive concept as the method for eliminating distortion of a distorted image provided by the above-mentioned embodiments of the present application, an embodiment of the present application further provides a computer program which, when executed by a processor, causes the processor to perform the above-described method for eliminating distortion of a distorted image. The method for eliminating distortion of a distorted image includes:

generating side information components of a distorted image, wherein, the distorted image is resulted from image processing on an original image, and the side information components represent distortion features of the distorted image with respect to the original image; and inputting distorted image color components of the distorted image and the side information components into a pre-established convolutional neural network model for convolution filtering so as to obtain distortion-eliminated image color components;

wherein, the convolutional neural network model is obtained through training based on a preset training set, and the training set includes original sample images, distorted image color components of multiple distorted images corresponding to each of the original sample image, and side information components of each of the distorted images.

In the embodiment shown above, the CNN model used is obtained by training based on a preset training set. The preset training set includes original sample images, distorted image color components of multiple distorted images corresponding to each of the original sample images, and side information components of each distorted image. The side information components can represent distortion features of the distorted image with respect to the original sample image. In the process of distortion elimination filtering, for the distorted image, side information components of the distorted image is first generated, and then distorted image color components and the side information components of the distorted image are input into a pre-established CNN model for convolution filtering to obtain a distortion-eliminated image color component. Thereby, the distortion elimination processing is performed on the distorted image using the CNN model.

Figure 10:
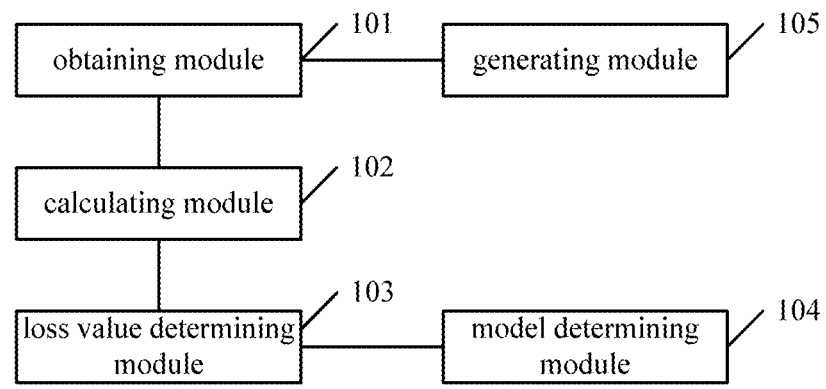
FIG. 10 is a schematic structural diagram of CNN model training provided by an embodiment of the present application.

Based on the same inventive concept, according to the method for training a CNN model provided by the above embodiment of the present application, another embodiment of the present application further provides a CNN model training apparatus, and a schematic structural diagram thereof is shown in FIG. 10. The device specifically includes:

an obtaining module 101, configured or obtaining a preset training set; wherein the preset training set includes original sample image, distorted image color components of multiple distorted images corresponding to each of the original sample images, and side information components of each distorted image that represent distortion features of the distorted image with respect to the original sample image;

a calculating module 102, configured for inputting distorted image color components and side information components of each distorted image in the preset training set into a convolutional neural network of a preset structure for convolution filtering, so as to obtain color components of a distortion-eliminated image corresponding to the distorted image;

a loss value determining module 103, configured for determining a loss value of the distortion-eliminated image based on original image color components of the original sample image and obtained color components of the distortion-eliminated image; and a model determining module 104, configured for completing the training when convergence of the convolutional neural network of preset structure is determined based on the loss value, and thereby obtaining a CNN model.

In an embodiment of the present application, the side information components may represent at least one of the following distortion features:

a degree of the distortion of the distorted image with respect to the original image;

a position of the distortion of the distorted image with respect to the original image; and a type of the distortion of the distorted image with respect to the original image.

In an embodiment of the present application, the device may further include:

a generating module 105, configured for generating side information components of a distorted image, and further configured for:

determining a distortion degree value of each pixel point in the distorted image; and generating, based on positions of pixel points in the distorted image, side information components of the distorted image by using obtained distortion degree values of pixel points, wherein, the value of each of the side information components corresponds to a pixel point at the same position in the distorted image In an embodiment of the present application, the generating module 105 is specifically configured for:

for a distorted image resulted from encoding and decoding, obtaining quantization parameters of each of encoded regions, and determining the distortion degree value of each pixel point in the distorted image as the quantization parameter of an encoded region in which the pixel point is located; or for a distorted image resulted from super-resolution processing, determining the up-sampling multiple in the super-resolution processing as the distortion degree value of each pixel point in the distorted image; or evaluating the distorted image through a non-reference image quality evaluation method to obtain the distortion degree value of each pixel point in the distorted image.

In an embodiment of the present application, the generating module 105 is specifically configured for:

determining, according to positions of pixel points in the distorted image, the obtained distortion degree value of each pixel point as the value of a side information component of the distorted image at the same position with the pixel point; or performing normalization on the obtained distortion degree values of pixel points based on the range of the pixel values of the distorted image to obtain normalized distortion degree values, the range of which is the same with the range of the pixel values; determining, according to positions of pixel points in the distorted image, the normalized distortion degree value of each pixel point as the value of a side information component of the distorted image at the same position with the pixel point.

In the embodiment shown in FIG. 10, a preset training set used for training includes original sample image, distorted image color components of multiple distorted images corresponding to each of the original sample images, and side information components of each distorted image. The side information components can represent distortion features of the distorted image with respect to the original sample image. Thereby, a CNN model for performing distortion elimination processing on a distorted image is provided.

Based on the same inventive concept as the CNN model training method provided by the above embodiment of the present application, another embodiment of the present application further provides an electronic device, and a schematic structural diagram thereof is shown in FIG. 9. The electronic device specifically include:

a processor 111, a communication interface 112, a memory 113, and a communication bus 114, wherein the processor 111, the communication interface 112, and the memory 113 complete communication with each other through the communication bus 114.

The memory 113 is configured to store a computer program.

The processor 111 is configured to execute the computer program so as to perform the CNN model training method above. The CNN model training method includes:

obtaining a preset training set; wherein the preset training set includes original sample images, distorted image color components of multiple distorted images corresponding to each of the original sample images, and side information components of each distorted image that represent distortion features of the distorted image with respect to the original sample image;

inputting distorted image color components and side information components of each distorted image in the preset training set into a convolutional neural network of a preset structure for convolution filtering, so as to obtain color components of a distortion-eliminated image corresponding to the distorted image;

determining a loss value of the distortion-eliminated image based on original image color components of the original sample image and obtained color components of the distortion-eliminated image; and completing the training when convergence of the convolutional neural network of preset structure is determined based on the loss value, and thereby obtaining a CNN model.

Figure 11:
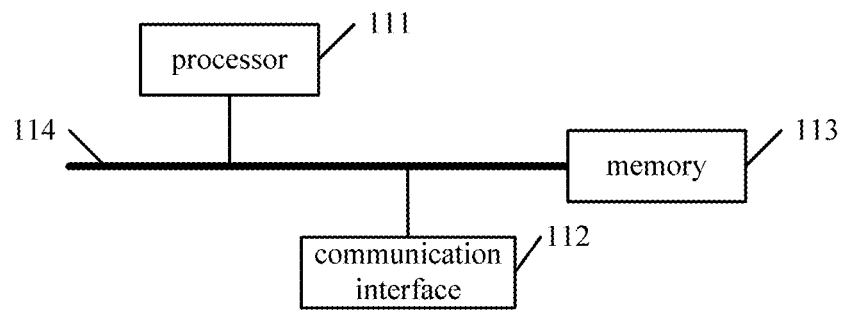
FIG. 11 is a schematic structural diagram of an electronic device provided by an embodiment of the present application.

In the embodiment shown in FIG. 11, a preset training set used for training includes original sample images, distorted image color components of multiple distorted images corresponding to each of the original sample images, and side information components of each distorted image. The side information components can represent distortion features of the distorted image with respect to the original sample image. Thereby, a CNN model for performing distortion elimination processing on a distorted image is provided.

Based on the same inventive concept as the CNN model training method provided by the above embodiment of the present application, another embodiment of the present application further provides a computer-readable storage medium, wherein the computer-readable storage medium stores a computer program, and the computer program implements the above-described CNN model training method when being executed by a processor. Wherein, the CNN model training method includes:

obtaining a preset training set; wherein the preset training set includes original sample images, distorted image color components of multiple distorted images corresponding to each of the original sample images, and side information components of each distorted image that represent distortion features of the distorted image with respect to the original sample image;

inputting distorted image color components and side information components of each distorted image in the preset training set into a convolutional neural network of a preset structure for convolution filtering, so as to obtain color components of a distortion-eliminated image corresponding to the distorted image;

determining a loss value of the distortion-eliminated image based on original image color components of the original sample image and obtained color components of the distortion-eliminated image; and completing the training when convergence of the convolutional neural network of preset structure is determined based on the loss value, and thereby obtaining a CNN model.

In the above embodiment, a preset training set used for training includes original sample images, distorted image color components of multiple distorted images corresponding to each of the original sample images, and side information components of each distorted image. The side information components can represent distortion features of the distorted image with respect to the original sample image. Thereby, a CNN model for performing distortion elimination processing on a distorted image is provided.

Based on the same inventive concept as the CNN model training method provided by the above embodiment of the present application, correspondingly, another embodiment of the present application further provides a computer program, and the computer program implements the above-described CNN model training method when being executed by a processor. Wherein, the CNN model training method includes:

obtaining a preset training set; wherein the preset training set includes original sample images, distorted image color components of multiple distorted images corresponding to each of the original sample images, and side information components of each distorted image that represent distortion features of the distorted image with respect to the original sample image;

inputting distorted image color components and side information components of each distorted image in the preset training set into a convolutional neural network of a preset structure for convolution filtering, so as to obtain color components of a distortion-eliminated image corresponding to the distorted image;

determining a loss value of the distortion-eliminated image based on original image color components of the original sample image and obtained color components of the distortion-eliminated image; and completing the training when convergence of the convolutional neural network of preset structure is determined based on the loss value, and thereby obtaining a CNN model.

In the above embodiment, a preset training set used for training includes an original sample image, distorted image color components of multiple distorted images corresponding to the original sample image, and side information components of each distorted image. The side information components can represent distortion features of the distorted image with respect to the original sample image. Thereby, a CNN model for performing distortion elimination processing on a distorted image is provided.

It should be noted that, in the specification, relationship terms such as "first," "second" and the like are only used to distinguish one entity or operation from another entity or operation, and do not necessarily require or imply that there is any such actual relationship or order between those entities or operations. Moreover, the terms "include," "contain" or any other variants are intended to cover a non-exclusive inclusion, such that processes, methods, objects or devices including a series of elements include not only those elements, but also other elements not specified or the elements inherent to those processes, methods, objects, or devices. Without further limitations, an element limited by the phrase "include(s) a . . . " do not exclude that there are other identical elements in the processes, methods, objects, or devices that include that element.

The various embodiments in the present specification are described in a related manner, same or similar parts among the various embodiments may be referred to each other, and each embodiment focuses on the differences from the other embodiments. In particular, for the embodiments of a device for eliminating distortion of a distorted image, a CNN model training device, an electronic device, computer readable storage medium and the computer program, since they are basically similar to the embodiments of a method for eliminating distortion of a distorted image and a CNN model training method, the descriptions are relatively simple, and the relevant parts can be referred to the description of the embodiments of a method for eliminating distortion of a distorted image and a CNN model training method.

The above description is only the preferred embodiments of the present application, and is not intended to limit the protection scope of the present application. Any modifications, equivalent substitutions, improvements, and the like made within the spirit and principles of the present application fall within the protection scope of the present application.

The invention claimed is:

1. A method for eliminating distortion of a distorted image, comprising:

generating side information components of a distorted image, wherein, the distorted image is resulted from image processing on an original image, and the side information components represent distortion features of the distorted image with respect to the original image; and inputting distorted image color components of the distorted image and the side information components into a pre-established convolutional neural network model for convolution filtering so as to obtain distortion-eliminated image color components;

wherein, the convolutional neural network model is obtained through training based on a preset training set, and the training set comprises original sample images, distorted image color components of multiple distorted images corresponding to each of the original sample images, and side information components of each of the distorted images;

wherein, the side information components represent at least one of the following distortion features:

a degree of the distortion of the distorted image with respect to the original image;

a position of the distortion of the distorted image with respect to the original image; and a type of the distortion of the distorted image with respect to the original image.

2. The method according to claim 1, wherein, generating side information components of a distorted image comprises:
   determining a distortion degree value of each pixel point in the distorted image; and
   generating, based on positions of pixel points in the distorted image, side information components of the distorted image by using obtained distortion degree values of pixel points, wherein, the value of each of the side information components corresponds to a pixel point at the same position in the distorted image.

3. The method according to claim 2, wherein, determining a distortion degree value of each pixel point in the distorted image comprises:
   for a distorted image resulted from encoding and decoding, obtaining quantization parameters of each of encoded regions, and determining the distortion degree value of each pixel point in the distorted image as the quantization parameter of an encoded region in which the pixel point is located; or
   for a distorted image resulted from super-resolution processing, determining the up-sampling multiple in the super-resolution processing as the distortion degree value of each pixel point in the distorted image; or
   evaluating the distorted image through a non-reference image quality evaluation method to obtain the distortion degree value of each pixel point in the distorted image.

4. The method according to claim 2, wherein, generating, based on positions of pixel points in the distorted image, side information components of the distorted image by using obtained distortion degree values of pixel points comprises:
   determining, according to positions of pixel points in the distorted image, the obtained distortion degree value of each pixel point as the value of a side information component of the distorted image at the same position with the pixel point; or
   performing normalization on the obtained distortion degree values of pixel points based on the range of the pixel values of the distorted image to obtain normalized distortion degree values, the range of which is the same with the range of the pixel values; determining, according to positions of pixel points in the distorted image, the normalized distortion degree value of each pixel point as the value of a side information component of the distorted image at the same position with the pixel point.

5. The method according to claim 1, wherein, training of the convolutional neutral network model based on the preset training set comprises:
   obtaining a preset training set;
   inputting distorted image color components and side information components of each distorted image in the preset training set into a convolutional neural network of a preset structure for convolution filtering, so as to obtain color components of a distortion-eliminated image corresponding to the distorted image;
   determining a loss value of the distortion-eliminated image based on original image color components of the original sample image and obtained color components of the distortion-eliminated image; and
   completing the training when convergence of the convolutional neural network of preset structure is determined based on the loss value, and thereby obtaining a CNN model.

6. An electronic device, comprising a processor, a communication interface, a memory, and a communication bus, wherein the processor, the communication interface, and the memory are communicatively connected with each other via the communication bus;
   the memory is configured to store a computer program;
   the processor is configured to execute the computer program so as to perform method steps according to claim 1.

7. A non-transitory computer-readable storage medium having a computer program stored thereon which, when executed by a processor, causes the processor to perform method steps according to claim 1.

8. An apparatus for eliminating distortion of a distorted image, comprising:
   a generating module, configured for generating side information components of a distorted image, wherein, the distorted image is resulted from image processing on an original image, and the side information components represent distortion features of the distorted image with respect to the original image; and
   a filtering module, configured for inputting distorted image color components of the distorted image and the side information components into a pre-established convolutional neural network model for convolution filtering so as to obtain distortion-eliminated image color components;
   wherein, the convolutional neural network model is obtained through training based on a preset training set, and the training set comprises original sample images, distorted image color components of multiple distorted images corresponding to each of the original sample images, and side information components of each of the distorted images;
   wherein, the side information components represent at least one of the following distortion features:
   a degree of the distortion of the distorted image with respect to the original image;
   a position of the distortion of the distorted image with respect to the original image; and
   a type of the distortion of the distorted image with respect to the original image.

9. The apparatus according to claim 8, wherein, the generating module is configured for determining a distortion degree value of each pixel point in the distorted image; and generating, based on positions of pixel points in the distorted image, side information components of the distorted image by using obtained distortion degree values of pixel points, wherein, the value of each of the side information components corresponds to a pixel point at the same position in the distorted image.

10. The apparatus according to claim 9, wherein, the generating module is configured for:
    for a distorted image resulted from encoding and decoding, obtaining quantization parameters of each of encoded regions, and determining the distortion degree value of each pixel point in the distorted image as the quantization parameter of a encoded region in which the pixel point is located; or
    for a distorted image resulted from super-resolution processing, determining the up-sampling multiple in the super-resolution processing as the distortion degree value of each pixel point in the distorted image; or
    evaluating the distorted image through a non-reference image quality evaluation method to obtain the distortion degree value of each pixel point in the distorted image.

11. The apparatus according to claim 9, wherein, the generating module is configured for:

determining, according to positions of pixel points in the distorted image, the obtained distortion degree value of each pixel point as the value of a side information component of the distorted image at the same position with the pixel point; or performing normalization on the obtained distortion degree values of pixel points based on the range of the pixel values of the distorted image to obtain normalized distortion degree values, the range of which is the same with the range of the pixel values; determining, according to positions of pixel points in the distorted image, the normalized distortion degree value of each pixel point as the value of a side information component of the distorted image at the same position with the pixel point.

12. The apparatus of claim 8, further comprising:

an obtaining module, configured for obtaining a preset training set;

a calculating module, configured for inputting distorted image color components and side information components of each distorted image in the preset training set into a convolutional neural network of a preset structure for convolution filtering, so as to obtain color components of a distortion-eliminated image corresponding to the distorted image;

a loss value determining module, configured for determining a loss value of the distortion-eliminated image based on original image color components of the original sample image and obtained color components of the distortion-eliminated image; and a model determining module, configured for completing the training when convergence of the convolutional neural network of preset structure is determined based on the loss value, and thereby obtaining a CNN model.

* * * * *